United States Patent
Hsu

(10) Patent No.: US 8,959,720 B2
(45) Date of Patent: Feb. 24, 2015

(54) SYNCHRONOUS MOVEMENT DEVICE APPLIED TO DUAL-SHAFT SYSTEM

(71) Applicant: First Dome Corporation, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 14/037,624

(22) Filed: Sep. 26, 2013

(65) Prior Publication Data

US 2014/0251044 A1    Sep. 11, 2014

Related U.S. Application Data

(63) Continuation-in-part of application No. 13/914,782, filed on Jun. 11, 2013.

(30) Foreign Application Priority Data

Mar. 11, 2013   (TW) .............................. 102108559 A

(51) Int. Cl.
  *E05D 7/00*   (2006.01)
  *E05D 11/08*   (2006.01)
  *F16H 19/08*   (2006.01)
  *F16H 21/44*   (2006.01)

(52) U.S. Cl.
  CPC ...................................... *F16H 21/44* (2013.01)
  USPC ................... 16/366; 16/303; 16/330; 16/342

(58) Field of Classification Search
  USPC ........... 16/354, 366, 365, 368, 369, 370, 342, 16/340, 338, 337; 361/679.08, 679.11, 361/679.02, 679.15, 679.27; 455/90.3, 455/575.1, 575.3, 575.8; 379/433.12, 379/433.13; 348/373, 333.01, 333.06, 794
  See application file for complete search history.

(56) References Cited

U.S. PATENT DOCUMENTS

| | | | | |
|---|---|---|---|---|
| 7,117,563 B2 * | 10/2006 | Chen et al. | ...................... | 16/330 |
| 7,140,074 B2 * | 11/2006 | Han et al. | ......................... | 16/366 |
| 7,426,406 B2 * | 9/2008 | Maatta et al. | .............. | 455/575.8 |
| 7,512,426 B2 * | 3/2009 | Maatta et al. | .............. | 455/575.1 |
| 7,515,707 B2 * | 4/2009 | Ka et al. | .................... | 379/433.12 |
| 7,565,717 B2 * | 7/2009 | Duan et al. | ...................... | 16/303 |
| 7,913,356 B2 * | 3/2011 | Duan et al. | ...................... | 16/303 |
| 2005/0050686 A1 * | 3/2005 | Kurokawa | ........................ | 16/354 |
| 2007/0136992 A1 * | 6/2007 | Lu et al. | ......................... | 16/330 |

(Continued)

FOREIGN PATENT DOCUMENTS

JP    2007064427 A  *  3/2007
JP    2008141712 A  *  6/2008

*Primary Examiner* — Chuck Mah
(74) *Attorney, Agent, or Firm* — Rosenberg, Klein & Lee

(57) ABSTRACT

A synchronous movement device of dual-shaft system includes a first shaft and a second shaft, which are assembled with each other and synchronously rotatable. The synchronous movement device further includes a driver disposed on the first shaft and a reactor disposed on the second shaft and a link unit connected between the driver and the reactor. The driver is formed with a driving rail. The reactor is formed with a reacting rail. When the first shaft drives the driver to rotate, the driver pushes the link unit to move along the first and second shafts to forcedly push the reactor to rotate in a direction reverse to the moving direction of the driver. Accordingly, the first and second shafts are synchronously rotated.

14 Claims, 5 Drawing Sheets

(56) References Cited

U.S. PATENT DOCUMENTS

| | | | |
|---|---|---|---|
| 2008/0109995 A1* | 5/2008 | Kuwajima et al. | 16/354 |
| 2009/0282650 A1* | 11/2009 | Jin et al. | 16/367 |
| 2010/0071159 A1* | 3/2010 | Myung | 16/303 |

* cited by examiner

SYNCHRONOUS MOVEMENT DEVICE APPLIED TO DUAL-SHAFT SYSTEM

This application is a continuation-in-part application of U.S. patent application Ser. No. 13/914,782, filed 11 Jun. 2013, entitled "SYNCHRONOUS MOVEMENT DEVICE APPLIED TO DUAL-SHAFT SYSTEM", currently pending.

BACKGROUND OF THE INVENTION

1. Field of the Invention

The present invention relates generally to a synchronous movement device of dual-shaft system including a first shaft and a second shaft. The synchronous movement device includes a driver disposed on the first shaft and formed with a driving rail and a reactor disposed on the second shaft and formed with a reacting rail and a link unit connected between the driver and the reactor. In operation, the driver, the link unit and the reactor serve to transmit force to make the first and second shafts synchronously rotate.

2. Description of the Related Art

There are various electronic apparatuses provided with covers or display screens or viewers, such as mobile phones, notebooks, PDA, digital imagers and electronic books. The covers or display screens or viewers are pivotally mounted on the electronic apparatuses via pivot pins or rotary shafts, whereby the covers or display screens or viewers can be freely rotated and opened/closed under external force.

In order to operate the display module (such as the screen) and/or the apparatus body module of the electronic apparatus in more operation modes and application ranges, a dual-shaft mechanism is provided between the display module and the apparatus body module, whereby the display module and/or the apparatus body module can be operated in different operation modes by different rotational angles.

In the above conventional pivot pin structures or rotary shaft structures, generally multiple gaskets with through holes and recessed/raised locating sections, multiple frictional plates and multiple cooperative springs are assembled on the rotary shaft. Two ends of the rotary shaft are respectively fixed by means of retainer rings or retainer members. The springs serve to store energy and release the energy to achieve the objects of rotating and locating the rotary shaft or pivot pin assembly. Basically, the above structures are relatively complicated and it is hard to assemble the structures. Moreover, after a period of operation, the recessed/raised locating sections of the gaskets or frictional plates are likely to wear. This will affect the locating effect.

There is also a conventional mechanism composed of rollers and drive wires (or transmission belts) for transmitting force to the rotary shaft so as to rotate the rotary shaft. As known by those who are skilled in this field, during the operation process of the wires or the transmission belts, delay of kinetic energy transmission will take place. This is because there is a gap between the wires (or transmission belts) and the rollers and the wires (or transmission belts) will slip or untruly operate. Also, the wires (or transmission belts) are made of elastic material and the fixing structure for assembling the wires (or transmission belts) with the rollers is not ideal. As a result, in force transmission, the load on the wires or the pulling force applied to the wires will increase. In this case, the transmission and shift effect of the wires will be deteriorated and the wires may detach from the rollers. Especially, after a period of use, the force of the wires or transmission belts, which is preset in the assembling process will decrease due to elastic failure. Under such circumstance, the synchronous movement effect of the transmission mechanism will be deteriorated.

In some cases, the wires or transmission belts have serious elastic fatigue and often detach from the rollers during the movement of the slide cover module. Under such circumstance, the rotary shaft device will lose its synchronous displacement effect.

There is another problem existing in the application and manufacturing of the wires or transmission belts. That is, during the assembling process of the wires or transmission belts, the wires or transmission belts need to be tensioned. This will make it more difficult to control the quality of wiring and assembling. Therefore, the ratio of good products can be hardly promoted and the assembling time can be hardly shortened. As a result, the manufacturing cost is increased.

In order to improve the above problems, a conventional dual-shaft synchronous movement device has been developed. Such dual-shaft synchronous movement device employs multiple gears for transmitting force. However, as known by those who are skilled in this field, with the transmission gears, the gap between the shafts of the dual-shaft synchronous movement device can be hardly minified. Therefore, the entire transmission unit or structure will occupy a considerably large space. Especially, when the transmission unit is applied to a notebook or a miniaturized electronic device, the electronic device can hardly meet the requirement for lightweight and slimmed design. This is not what we expect.

The conventional rotary shaft structures and the relevant connection components thereof have some shortcomings in use and structural design that need to be overcome. It is therefore tried by the applicant to provide a dual-shaft synchronous movement device and an assembling method thereof to eliminate the shortcomings existing in the conventional rotary shaft structure so as to widen the application range and facilitate the assembling process of the rotary shaft structure.

The synchronous movement device applied to the dual-shaft system of the present invention has the following advantages:

1. The synchronous movement device of the present invention is mounted between the display module and the apparatus body module. When an operator 0°~180° rotates the display module, the apparatus body module is synchronously relatively 0°~180° rotated. Therefore, the total rotational angle of the display module and the apparatus body module is 360°. Accordingly, the operator can more quickly and conveniently operate the electronic apparatus in more operation modes (or application ranges). Also, the synchronous movement effect and operational stability of the synchronous movement device and the cooperative rotary shafts are enhanced.

2. The synchronous movement device or transmission mechanism of the present invention is free from any of the gaskets with through holes and recessed/raised locating sections and the frictional plates as well as the springs employed in the conventional rotary shaft structures. Therefore, the problems existing in the conventional technique that the structures are relatively complicated and it is hard to assemble the structures and the recessed/raised locating sections of the gaskets or frictional plates are likely to wear can be apparently improved.

3. The synchronous movement device of the present invention overcomes the problem of delay of kinetic energy transmission of the conventional wires or transmission belts. The synchronous movement device of the present invention also solves the problem of the conventional transmission mechanism that there is a gap between the wires and the rollers so that the wires will slip or untruly operate. The synchronous movement device of the present invention also solves the problem of the conventional transmission mechanism that the fixing structure for assembling the wires with the rollers is not ideal so that in force transmission, the load on the wires or the pulling force applied to the wires will increase to deteriorate the transmission effect.

4. The synchronous movement device or transmission mechanism of the present invention is free from any gear for transmitting force as in the conventional technique. Therefore, the gap between the shafts can be as minified as possible. Therefore, the space occupied by the entire transmission unit or structure is reduced. Accordingly, when the transmission unit is applied to an electronic device, the electronic device can meet the requirement for lightweight and slimmed design.

SUMMARY OF THE INVENTION

It is therefore a primary object of the present invention to provide a synchronous movement device of dual-shaft system including a first shaft and a second shaft. The synchronous movement device includes a driver disposed on the first shaft and a reactor disposed on the second shaft and a link unit connected between the driver and the reactor. The driver is formed with a driving rail. The reactor is formed with a reacting rail. When the first shaft drives the driver to rotate, the driver pushes the link unit to move along the first and second shafts to forcedly push the reactor to rotate in a direction reverse to the moving direction of the driver. Accordingly, the first and second shafts are synchronously rotated.

In the above synchronous movement device of dual-shaft system, the driver is a cylindrical body and a surface of the cylindrical body of the driver being recessed to form a spiral driving rail. The reactor is a cylindrical body and a surface of the cylindrical body of the reactor being recessed to form a spiral reacting rail.

In the above synchronous movement device of dual-shaft system, the link unit is a block body having a driving boss and a reacting boss respectively positioned in the driving rail and the reacting rail.

When the first shaft drives the driver to rotate, in cooperation with the driving rail, the driving boss and the link unit are pushed to move in a direction parallel to the first and second shafts. At this time, the reacting boss moves along the reacting rail to push the reactor to rotate, whereby the second shaft is synchronously rotated in a direction reverse to the rotational direction of the first shaft.

The present invention can be best understood through the following description and accompanying drawings, wherein:

DETAILED DESCRIPTION OF THE PREFERRED EMBODIMENTS

Figure 1:
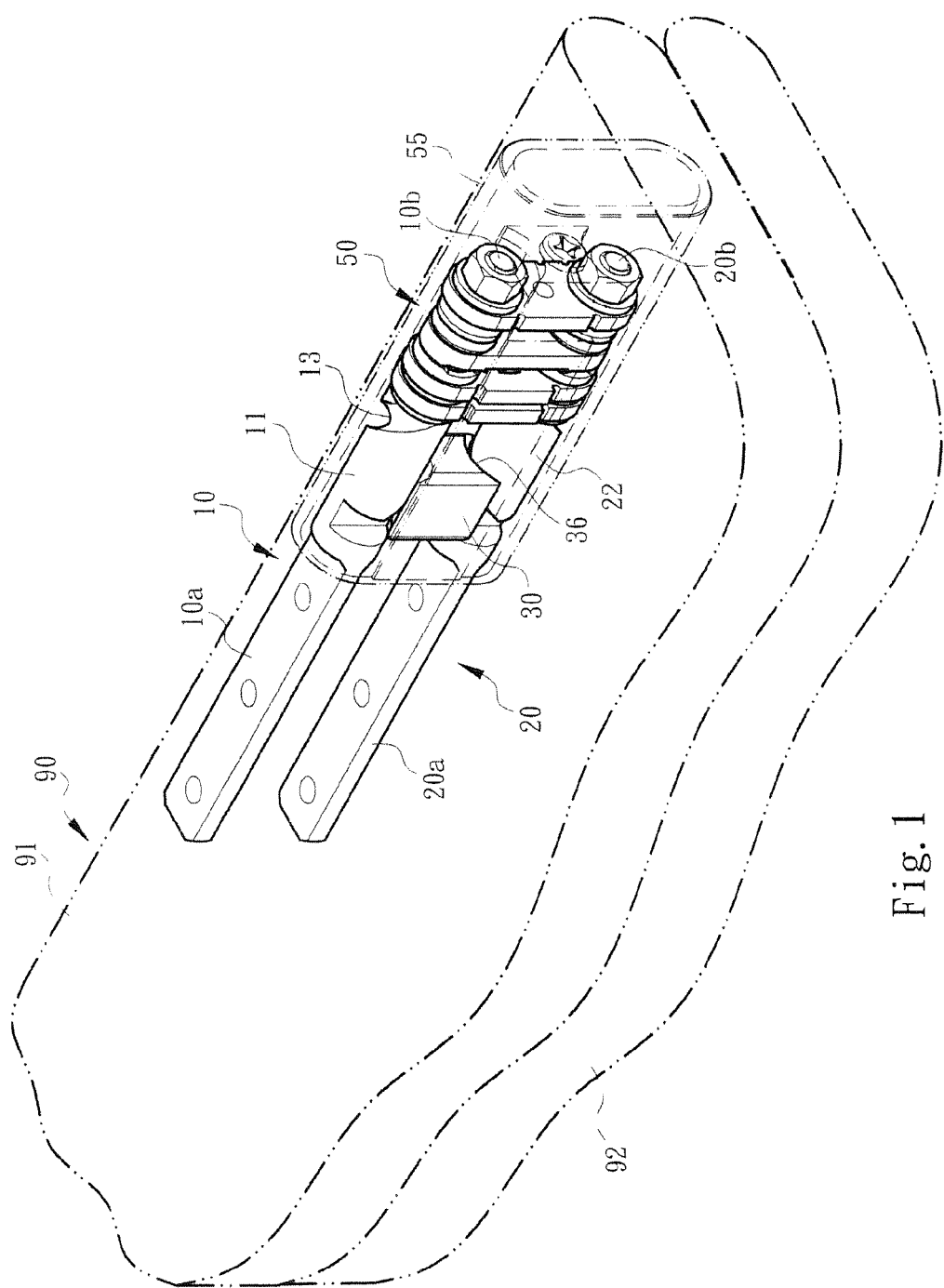
FIG. 1 is a perspective assembled view of the synchronous movement device of the present invention and the casing thereof, in which the phantom lines show that the display module is closed on the apparatus body module.
Figure 2:
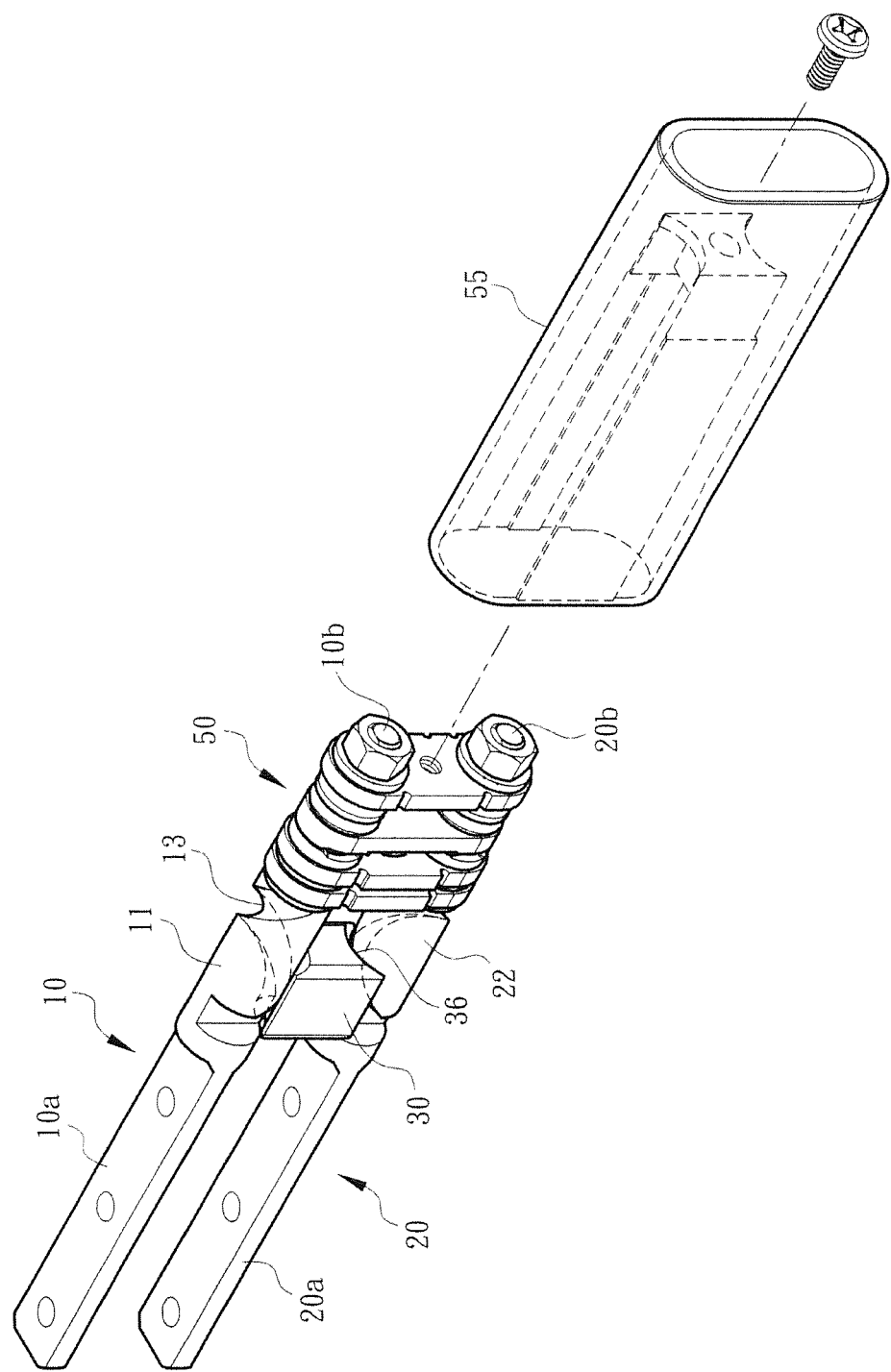
FIG. 2 is a front perspective view of the synchronous movement device of the present invent ion.
Figure 3:
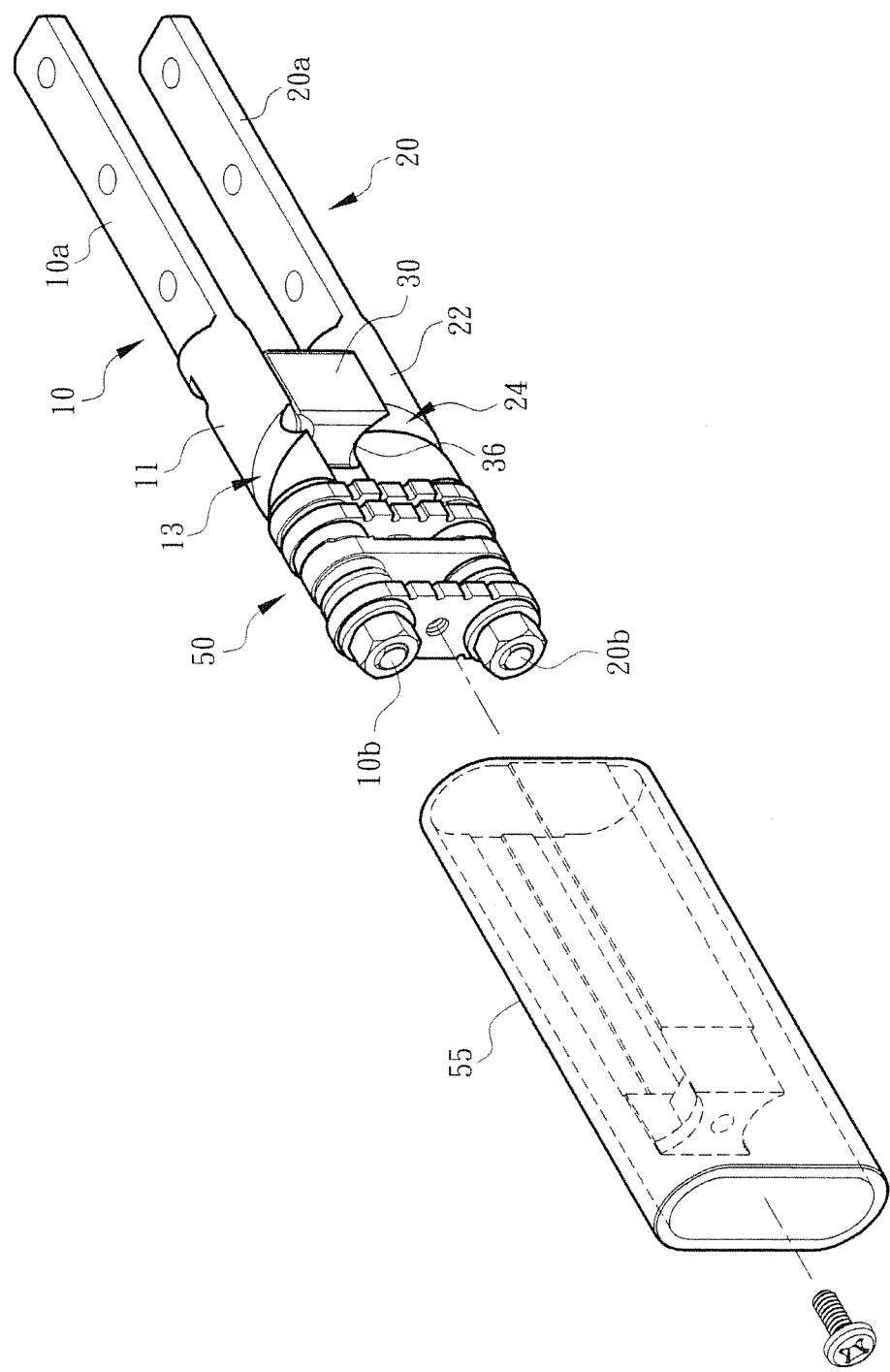
FIG. 3 is a rear perspective view of the synchronous movement device of the present invention.

Please refer to FIGS. 1, 2 and 3. The synchronous movement device of dual-shaft system of the present invention includes a first shaft 10 and a second shaft 20. The first and second shafts 10, 20 are assembled with each other and disposed in a casing 55. Each of the first and second shafts 10, 20 has a fixed end 10a, 20a and a pivoted end 10b, 20b. Through fixing seats (not shown), the fixed ends 10a, 20a of the first and second shafts 10, 20 are respectively fixed on a display module 91 and an apparatus body module 92 of an electronic apparatus 90 (such as a mobile phone or a computer).

Figure 4:
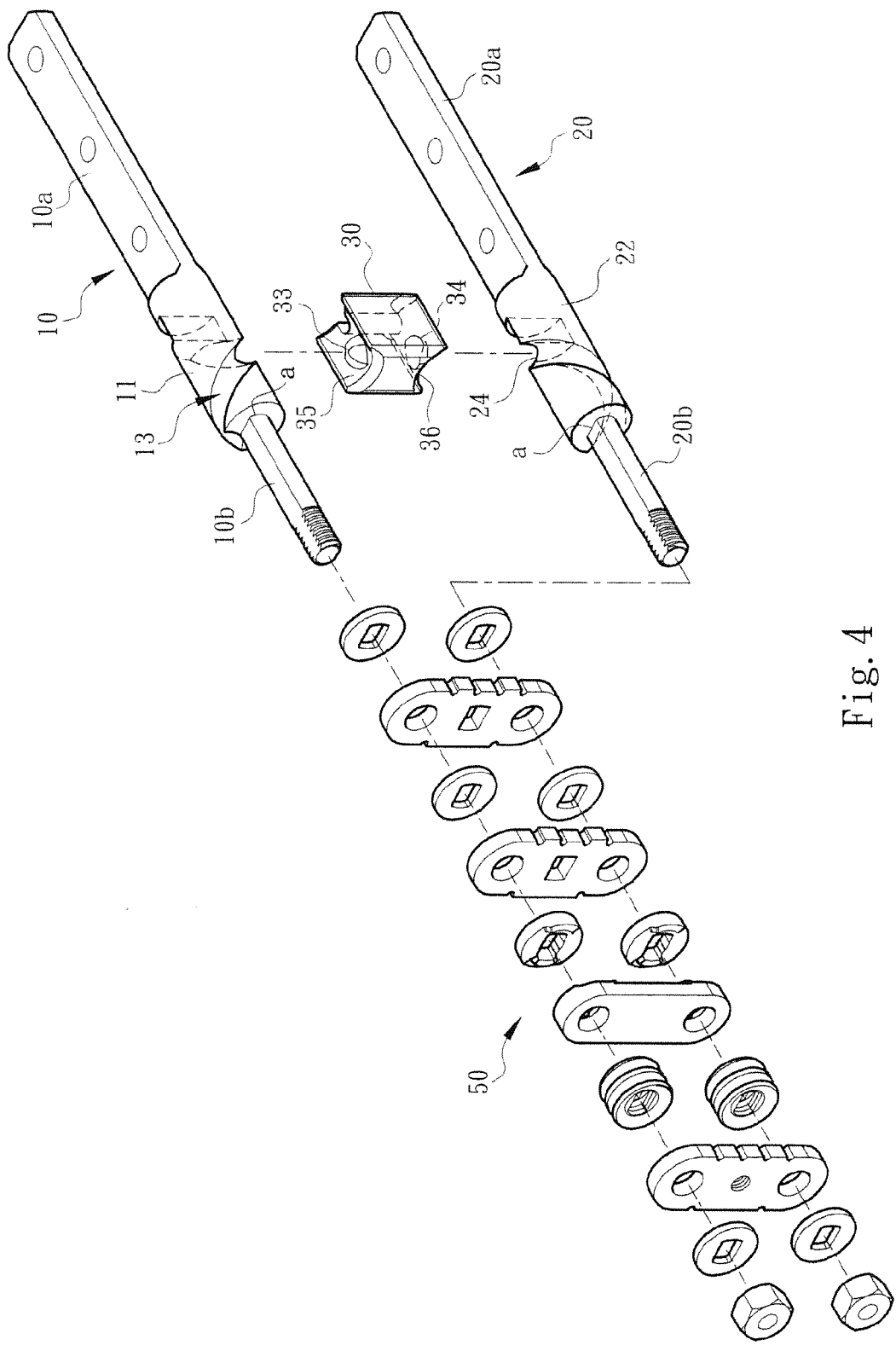
FIG. 4 is a perspective exploded view of the synchronous movement device of the present invention according to FIG. 3, showing the positional relationship between the first and second shafts, the driver, the driving rail, the link unit, the reactor and the reacting rail.

Please refer to FIGS. 2, 3 and 4. The pivoted end 10b of the first shaft 10 is provided with a driver 11 rotatable with the first shaft 10. The pivoted end 20b of the second shaft 20 is provided with a reactor 22 synchronously rotatable with the second shaft 22. In addition, the pivoted ends 10b, 20b of the first and second shafts 10, 20 are provided with a link unit 30 connected with the driver 11 and the reactor 22. The driver 11, reactor 22 and the link unit 30 are assembled on the first and second shafts 10, 20 via a fixing assembly 50. When the first shaft 10 drives the driver 11 to rotate, the link unit 30 is pushed and displaced to forcedly rotate the reactor 22 in a direction reverse to the moving direction of the driver 11, whereby the first and second shafts 10, 20 are synchronously rotated.

As shown in FIGS. 2, 3 and 4, the driver 11 and the reactor 22 are cylindrical bodies. Each of the driver 11 and the reactor 22 has a shaft hole a, whereby the driver 11 and the reactor 22 are respectively fitted on the pivoted ends 10b, 20b of the first and second shafts 10, 20.

As shown in FIG. 4, the shaft hole a has a cross-sectional configuration identical to that of the pivoted ends 10b, 20b of the first and second shafts. For example, in the drawings, the pivoted ends 10b, 20b of the first and second shafts have a rectangular cross section and the shaft hole a has an identical rectangular cross section, whereby the pivoted ends 10b, 20b of the first and second shafts can fitted in the shaft hole a. In this case, the driver 11 is rotatable with the first shaft 10, while the reactor 22 is rotatable with the second shaft 20.

In a preferred embodiment, the driver 11 and the pivoted end 10b of the first shaft 10 are integrally formed with each other and the reactor 22 and the pivoted end 20b of the second shaft 20 are integrally formed with each other.

As shown in FIGS. 2, 3 and 4, the driver 11 is a cylindrical body. The surface of the cylindrical body of the driver 11 is recessed to form a (spiral) driving rail 13. The reactor 22 is a cylindrical body. The surface of the cylindrical body of the reactor 22 is recessed to form a (spiral) reacting rail 24.

It should be noted that with the axis of the first shaft 10 or the second shaft 20 as a reference, the spiral direction of the driving rail 13 is reverse to the spiral direction of the reacting rail 24.

Please further refer to FIGS. 2, 3 and 4. Corresponding to the configuration of the driver 11 and the reactor 22, the link unit 30 is a block body formed with a first concaved face 35 and a second concaved face 36. A driving boss 33 is disposed on the first concaved face 35 and a reacting boss 34 is disposed on the second concaved face 36. The driving boss 33 and the reacting boss 34 are respectively positioned in the driving rail 13 and the reacting rail 24.

Figure 5:
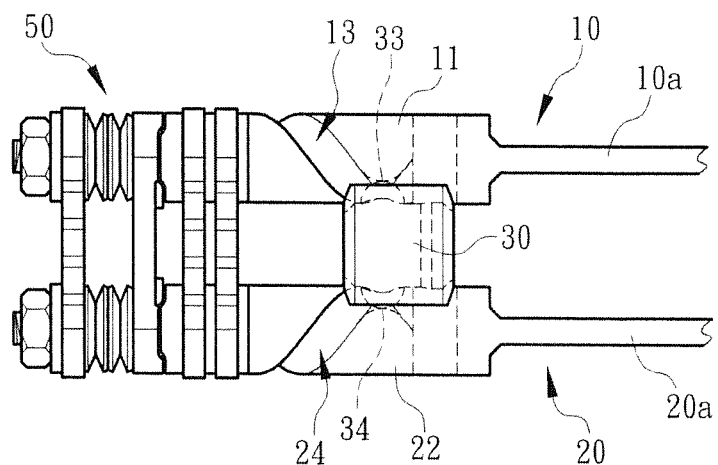
FIG. 5 is a plane view of the synchronous movement device of the present invention.
Figure 6:
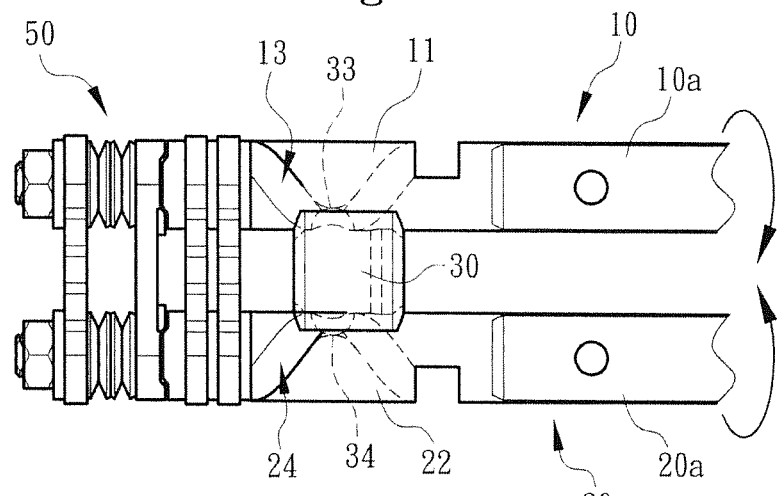
FIG. 6 is a plane view of the synchronous movement device of the present invention according to FIG. 5, showing that the first shaft and the driver are 90° rotated to synchronously move the link unit, the reactor and the second shaft.
Figure 7:
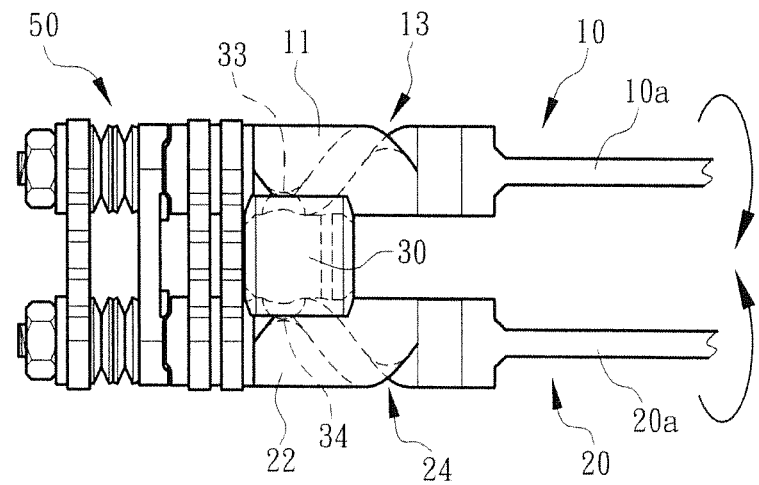
FIG. 7 is a plane view of the synchronous movement device of the present invention according to FIG. 5, showing that the first shaft and the driver are 180° rotated to synchronously move the link unit, the reactor and the second shaft.

Please refer to FIGS. 5, 6 and 7. When the first shaft 10 drives the driver 11 to rotate, in cooperation with the driving rail 13, the driving boss 33 and the link unit 30 are pushed to move in a direction parallel to the first and second shafts 10, 20. At this time, the reacting boss 34 moves along the reacting rail 24 to push the reactor 22 to rotate, whereby the second shaft 20 is synchronously rotated in a direction reverse to the rotational direction of the first shaft 10.

To speak more specifically, when the display module 91 is closed onto the apparatus body module 92, the angle contained therebetween is defined 0°. Please refer to FIGS. 5 and 6, when an operator opens the display module 91 to make the first shaft 10 drive the driver 11 to 90° rotate, the driving rail 13 pushes the driving boss 33 of the link unit 30 to make the link unit 30 move leftward as shown in FIG. 6.

Please refer to FIGS. 6 and 7. When the link unit 30 is moved, the reacting boss 34 is moved leftward along the reacting rail 24 to push the reactor 22, whereby the reactor 22 is rotated in a direction reverse to the rotational direction of the driver 11 and the second shaft 20 is synchronously rotated in a direction reverse to the rotational direction of the first shaft 10.

Accordingly, as shown in FIG. 6, when the operator opens the display module 91 to make the first shaft 10 counterclockwise rotate to a 90° position, the driver 11, the link unit 30 and the reactor 22 cooperate with each other to transmit the force and make the second shaft 20 (or the apparatus body module 92) synchronously clockwise rotates to a 90° position. That is, the first and second shafts 10, 20 (or the display module 91 and the apparatus body module 92) are totally relatively rotated by 180°.

Referring to FIG. 7, when the operator opens the display module 91 to make the first shaft 10 counterclockwise rotate to a 180° position, the second shaft 20 (or the apparatus body module 92) synchronously clockwise rotates to a 180° position. That is, the first and second shafts 10, 20 (or the display module 91 and the apparatus body module 92) are totally relatively rotated by 360°.

That is, by means of the synchronous movement device, a user can operate and rotate the display module 91 by a certain angle or range to achieve a travel double the rotational angle or range. Accordingly, the user can more quickly and conveniently operate the electronic apparatus.

It should be noted that during the force transmission process of the synchronous movement device of the present invention, the driver 11, the link unit 30 and the reactor 22 are cooperatively assembled with each other to minimize the possibility of torque change or slippage that often happens in the conventional device. In this case, the first and second shafts 10, 20 can be smoothly rotated. Moreover, once the rotational force disappears, the rotors stop rotating to be located in a desired position.

It should be noted that FIGS. 1, 2 and 3 (or 5, 6 and 7) show that the length of the link unit 30 is as minimized as possible. In practice, total length of the driver 11 (or the reactor 22) and the link unit 30 on the first shaft 10 (or the second shaft 20) is only about 13 mm. Obviously, the length and volume of the entire synchronous movement device are as minimized as possible.

In comparison with the conventional device, the synchronous movement device of the dual-shaft system of the present invention has the following advantages:

1. The rotary shafts (the first and second shafts 10, 20) are the relevant components (such as the driver 11, the link unit 30 and the reactor 22) together form a synchronous movement mechanism. This structure is apparently different from the conventional device, which employs multiple gears or rollers and drive wires (or transmission belts) for transmitting force and rotating the rotary shafts or multiple gaskets, frictional plates and cooperative springs for storing energy and releasing the energy.
2. The driver 11 and the reactor 22 and the cooperative link unit 30 together form a synchronous movement device. The synchronous movement device is mounted between the display module 91 and the apparatus body module 92. When an operator 0°~180° rotates the display module 91, the apparatus body module 92 will synchronously relatively rotate by 0°~180°. Accordingly, the total rotational angle of the display module 91 and the apparatus body module 92 is 360°. That is, by means of the synchronous movement device, a user can operate and rotate the display module 91 by a certain angle or range to achieve a travel double the rotational angle or range. Accordingly, the user can more quickly and conveniently operate the electronic apparatus in more operation modes (or application ranges).
3. The driver 11 and the reactor 22 and the cooperative link unit 30 together form a synchronous transmission structure different from the conventional transmission mechanism and relevant cooperative structures. The synchronous movement device of the present invention overcomes the problem of delay of kinetic energy transmission of the conventional wires or transmission belts. The synchronous movement device of the present invention also solves the problem of the conventional transmission mechanism that there is a gap between the wires and the rollers so that the wires will slip or untruly operate. The synchronous movement device of the present invention also solves the problem of the conventional transmission mechanism that the fixing structure for assembling the wires with the rollers is not ideal so that in force transmission, the load on the wires or the pulling force applied to the wires will increase to deteriorate the transmission effect.
4. The driver 11 and the reactor 22 and the cooperative link unit 30 together form a synchronous transmission structure advantageous over the conventional transmission mechanism in that the synchronous transmission structure is easier to manufacture and assemble. Moreover, the synchronous movement device or transmission mechanism of the present invention is free from any gear for transmitting force as in the conventional technique. Therefore, the gap between the shafts can be as minified as possible. Therefore, the space occupied by the entire transmission unit or structure is reduced. Accordingly, when the transmission unit is applied to an electronic device, the electronic device can meet the requirement for lightweight and slimmed design.

In conclusion, the synchronous movement device applied to the dual-shaft system of the present invention is different from and advantageous over the conventional device.

The above embodiments are only used to illustrate the present invention, not intended to limit the scope thereof. Many modifications of the above embodiments can be made without departing from the spirit of the present invention.

What is claimed is:

1. A synchronous movement device of dual-shaft system, comprising:
    a first shaft having a fixed end, a driver and a pivoted end, said driver being disposed between the pivoted end and the fixed end of the first shaft, the driver being formed with a driving rail;
    a second shaft having a fixed end, a reactor and a pivoted end, said reactor being disposed between the pivoted end and the fixed end of the second shaft, the reactor being formed with a reacting rail; and
    a link unit having a driving boss and a reacting boss respectively positioned in the driving rail and the reacting rail, the driver being rotatable with the first shaft to push the link unit to move along the first and second shafts so as to make the reactor rotate in a direction reverse to a moving direction of the driver, whereby the first and second shafts are synchronously rotated;
    wherein the link unit is a block body formed with a first concaved face and a second concaved face, the driving boss being disposed on the first concaved face and the reacting boss being disposed on the second concaved face.

2. The synchronous movement device of dual-shaft system as claimed in claim 1, wherein the driver and the reactor are cylindrical bodies, each of the driver and the reactor having a shaft hole, whereby the driver and the reactor are respectively fitted onto the pivoted ends of the first and second shafts.

3. The synchronous movement device of dual-shaft system as claimed in claim 2, wherein each shaft hole has a cross-sectional configuration identical to that of the pivoted ends of the first and second shafts.

4. The synchronous movement device of dual-shaft system as claimed in claim 3, wherein the pivoted ends of the first and second shafts have a rectangular cross section and the shaft hole has an identical rectangular cross section.

5. The synchronous movement device of dual-shaft system as claimed in claim 1, wherein the driver and the pivoted end of the first shaft are integrally formed with each other.

6. The synchronous movement device of dual-shaft system as claimed in claim 1, wherein the reactor and the pivoted end of the second shaft are integrally formed with each other.

7. The synchronous movement device of dual-shaft system as claimed in claim 1, wherein the driver is a cylindrical body, a surface of the cylindrical body of the driver being recessed to form the driving rail, the reactor being a cylindrical body, a surface of the cylindrical body of the reactor being recessed to form the reacting rail.

8. The synchronous movement device of dual-shaft system as claimed in claim 7, wherein the driving rail has a spiral direction reverse to a spiral direction of the reacting rail.

9. The synchronous movement device of dual-shaft system as claimed in claim 1, wherein the driving rail is a spiral structure and the reacting rail is also a spiral structure.

10. The synchronous movement device of dual-shaft system as claimed in claim 9, wherein the driving rail has a spiral direction reverse to a spiral direction of the reacting rail.

11. The synchronous movement device of dual-shaft system as claimed in claim 1, wherein the driver, the reactor and the link unit are assembled on the first and second shafts by means of fixing members.

12. The synchronous movement device of dual-shaft system as claimed in claim 1, the pivoted end of the first shaft, the pivoted end of the second shaft, the driver, the reactor and the link unit are assembled with each other and disposed in a casing.

13. The synchronous movement device of dual-shaft system as claimed in claim 1, wherein the fixed end of the first shaft, and the fixed end of the second shaft are adapted respectively to be fixed on a display module and an apparatus body module of an electronic apparatus.

14. The synchronous movement device of dual-shaft system as claimed in claim 1, wherein when the first shaft is 0°~180° rotated, the second shaft is synchronously 0°~180° rotated in a reverse direction.

* * * * *